(12) United States Patent
Tamamoto et al.

(10) Patent No.: US 7,660,665 B2
(45) Date of Patent: Feb. 9, 2010

(54) AUTONOMOUS MOBILE EQUIPMENT AND POSITION-OF-OBJECT AND OWN POSITION DETECTING SYSTEM

(75) Inventors: Junichi Tamamoto, Kasumigaura (JP); Yuji Hosoda, Kasumigaura (JP); Saku Egawa, Toride (JP); Toshihiko Horiuchi, Abiko (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 11/274,322

(22) Filed: Nov. 16, 2005

(65) Prior Publication Data
US 2006/0104502 A1    May 18, 2006

(30) Foreign Application Priority Data
Nov. 17, 2004  (JP)  ............................... 2004-332686

(51) Int. Cl.
*G01C 21/00* (2006.01)
(52) U.S. Cl. ........................ 701/207; 382/107; 382/153; 382/154; 901/1; 901/16; 901/30; 901/47
(58) Field of Classification Search ................ 701/302, 701/23, 25, 301, 262, 404, 207; 382/153, 382/154; 901/1
See application file for complete search history.

(56) References Cited

U.S. PATENT DOCUMENTS

| | | | | |
|---|---|---|---|---|
| 4,830,497 A | * | 5/1989 | Iwata et al. | ................. 356/394 |
| 5,363,305 A | | 11/1994 | Cox et al. | |
| 5,742,400 A | * | 4/1998 | Satoh | ......................... 382/262 |
| 2005/0122218 A1 | * | 6/2005 | Goggin | ...................... 340/552 |

FOREIGN PATENT DOCUMENTS

| | | |
|---|---|---|
| DE | 40 01 493 | 7/1991 |
| DE | 103 02 908 | 8/2004 |
| JP | 60-178373 | 9/1985 |
| JP | 01-196501 | 8/1989 |
| JP | 02-157983 | 6/1990 |
| JP | 05-174132 | 7/1993 |
| JP | 10-260724 | 9/1998 |
| JP | 2000-097697 | 4/2000 |
| JP | 2002-140655 | 5/2002 |
| JP | 2003-269937 | 9/2003 |
| JP | 2004-042148 | 2/2004 |

* cited by examiner

*Primary Examiner*—Tuan C To
*Assistant Examiner*—Redhwan Mawari
(74) *Attorney, Agent, or Firm*—Antonelli, Terry, Stout & Kraus, LLP.

(57) ABSTRACT

Autonomous mobile equipment includes a position-of-object and own position detecting system and a moving unit, and autonomously moves. The position-of-object and own position detecting system includes a database in which pieces of information on the superficial shape and position of an object are recorded. The superficial shape of the object detected by a position measuring unit is collated with the superficial shape of the object recorded in the database. If the collated superficial shapes agree with each other, the pieces of information on the object recorded in the database are transmitted to a traveling planning unit. If the collated superficial shapes disagree with each other, the information on the object acquired by the position measuring unit is transmitted to the traveling planning unit.

7 Claims, 10 Drawing Sheets

FIG. 9

| OBJECT NUMBER | CODE | POSITIONAL INFORMATION | | ATTRIBUTE DATA |
|---|---|---|---|---|
| | | ORIGIN | DIMENSION | |
| 1 | 1,0,1,1,0,1,0,0,1,0 | (xg1,yg1) | (xs1,ys1,zs1) | α |
| 2 | 1,1,1,0,0,1,1,0,0,1 | (xg2,yg2) | (rs2,zs2) | β |
| ... | ... | ... | ... | ... |
| N | 0,0,1,1,0,0,1,1,0,1 | (xgn,ygn) | (xsn,ysn,zsn) | ν |

AUTONOMOUS MOBILE EQUIPMENT AND POSITION-OF-OBJECT AND OWN POSITION DETECTING SYSTEM

The present application claims priority from Japanese application JP2004-332686 filed on Nov. 17, 2004, the content of which is hereby incorporated by reference into this application.

BACKGROUND OF THE INVENTION

The present invention relates to autonomous mobile equipment and a position-of-object and own position detecting system. More particularly, the present invention is concerned with autonomous mobile equipment such as a mobile robot or an autonomous vehicle that partly or totally autonomously moves while acquiring information on an ambient environment, and a position-of-object and own position detecting system to be included in the autonomous mobile equipment.

As for an autonomous mobile robot including an environment identification sensor, an obstacle identification device, an obstacle identification method, an obstacle identification program, and a mobile robot are described in Japanese Patent Laid-Open No. 2003-269937 (Patent Document 1). Patent Document 1 describes a device that identifies the position and shape of an obstacle according to information on a parallax of an image produced by an optical imaging means such as a plurality of charge-coupled devices (CCDs).

However, the conventional method of analyzing an image produced by the optical imaging means such as CCDs costs high at present but cannot offer satisfactory precision and requires much time for one analysis.

BRIEF SUMMARY OF THE INVENTION

An object of the present invention is to provide autonomous mobile equipment and a position-of-object and own position detecting system that highly precisely identify the position and shape of an object placed in an environment, in which the autonomous mobile equipment moves, and the own position of the autonomous mobile equipment, and that are implemented inexpensively with a simple configuration.

According to the first aspect of the present invention for accomplishing the above object, there is provided autonomous mobile equipment that autonomously moves in an environment in which an object other than the autonomous mobile equipment is present, and that includes a position-of-object and own position detecting system and a moving means. The position-of-object and own position detecting system includes: a position measuring means for measuring information on the object; a traveling planning means for planning a traveling route along which the autonomous mobile equipment travels; a database in which information on the object placed in the environment is recorded; and a collating means for collating the information on the object acquired by the position measuring means with the information on the object recorded in the database. The position measuring means sweeps radiation substantially horizontally so as to measure a relative angle, at which the autonomous mobile equipment meets the object, and a relative distance to the object, and thus detects the superficial shape of the object. Pieces of information on the superficial shape and position of the object placed in the environment are recorded in the database. The collating means collates the superficial shape of the object detected by the position measuring means with the superficial shape of the object recorded in the database. If the collated superficial shapes agree with each other, the information on the object recorded in the database is transmitted to the traveling planning means. If the collated superficial shapes disagree with each other, the information on the object acquired by the position measuring means is transmitted to the traveling planning means. The traveling planning means plans a traveling route, along which the autonomous mobile equipment travels, according to the information on the object sent from the collating means.

A more preferable example of a configuration in accordance with the first aspect of the present invention will be described below.

Binary information on the superficial shape of the object placed in the environment is recorded in the database. The collating means produces binary information on the superficial shape of the object detected by the position measuring means, and collates the produced binary information with the binary information on the superficial shape of the object recorded in the database.

Binary information on the superficial shape of an object placed in the environment and positional information on the object are recorded in the database. The collating means produces binary information on the superficial shape of the object detected by the position measuring means, and collates the produced binary information with the binary information on the superficial shape of the object recorded in the database. If the collated pieces of binary information agree with each other, the position of the autonomous mobile equipment is calculated based on the positional information on the object recorded in the database.

In addition to the foregoing features, the binary information in the database is produced using a predetermined unit length as a reference. The collating means produces binary information on the superficial shape of the object, which is detected by the position measuring means, using the unit length as a reference, and collates the produced binary information with the binary information on the superficial shape of the object recorded in the database.

Furthermore, a binary pattern expressing the object is elongated substantially perpendicularly to a surface scanned by the position measuring means. A traveling control means is further included for controlling the moving means according to a plan made by the traveling planning means.

According to the second aspect of the present invention for accomplishing the object, there is provided a position-of-object and own position detecting system which is included in autonomous mobile equipment that moves in an environment in which the autonomous mobile equipment and an object other than the autonomous mobile equipment are present. The position-of-object and own position detecting system includes: a position measuring means for measuring information on the object; a database in which information on the object placed in the environment is recorded; and a collating means for collating the information on the object acquired by the position measuring means with the information on the object recorded in the database. The position measuring means sweeps radiation substantially horizontally so as to measure a relative angle, at which the autonomous mobile equipment meets the object, and a relative distance to the object, and thus detects the superficial shape of the object. Pieces of information on the superficial shape and position of the object placed in the environment are recorded in the database. The collating means collates the superficial shape of the object detected by the position measuring means with the superficial shape of the object recorded in the database. If the superficial shapes agree with each other, the information on the object recorded in the database is transmitted. If the superficial shapes disagree with each other, the information on the object acquired by the position measuring means is transmitted.

A more preferable concrete example of a configuration in accordance with the second aspect of the present invention will be described below.

Binary information on the superficial shape of the object placed in the environment is recorded in the database. The collating means produces binary information on the superficial shape of the object detected by the position measuring means, and collates the produced binary information with the binary information on the superficial shape of the object recorded in the database.

Binary information on the superficial shape of the object placed in the environment and positional information on the object are recorded in the database. The collating means produces binary information on the superficial shape of the object detected by the position measuring means, and collates the produced binary information with the binary information on the superficial shape of the object recorded in the database. If the pieces of binary information agree with each other, the position of the autonomous mobile equipment is calculated based on the positional information on the object recorded in the database.

In addition to the foregoing features, the binary information in the database is produced using a predetermined unit length as a reference. The collating means produces binary information on the superficial shape of the object, which is detected by the position measuring means, using the unit length as a reference, and collates the produced binary information with the binary information on the superficial shape of the object recorded in the database.

Autonomous mobile equipment and a position-of-object and own position detecting system in accordance with the present invention can highly precisely identify the position and shape of an object placed in an environment in which the autonomous mobile equipment moves, and the own position of the autonomous mobile equipment, and can be implemented inexpensively with a simple configuration.

BRIEF DESCRIPTION OF THE SEVERAL VIEWS OF THE DRAWINGS

FIG. 9 shows an example of a structure of a database included in the autonomous mobile equipment.

DETAILED DESCRIPTION OF THE INVENTION

Referring to FIG. 1 to FIG. 10, autonomous mobile equipment and a position-of-object and own position detecting system in accordance with an embodiment of the present invention will be described below.

Figure 1:
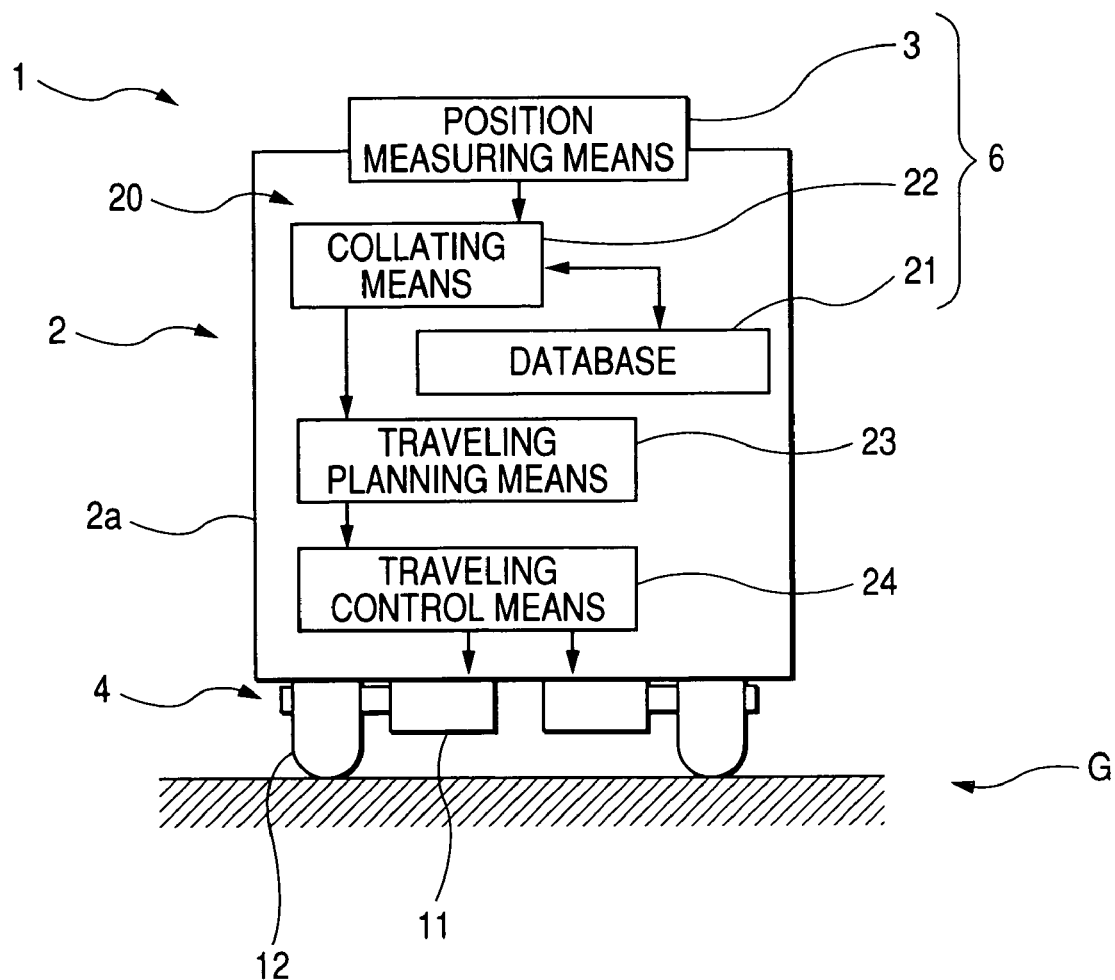
FIG. 1 illustratively shows an autonomous mobile equipment in accordance with the present invention.

An example of autonomous mobile equipment 1 will be described with reference to FIG. 1. The autonomous mobile equipment 1 includes an equipment body 2, a position measuring means 3, and a moving means 4. The autonomous mobile equipment 1 is designed to move in an environment in which an object 5 other than the autonomous mobile equipment is present, and will be described by taking a mobile robot for instance. Incidentally, the object 5 is a generic term encompassing a plurality of objects 5A, 5B, and 5C.

The equipment body 2 has components, which include a controller 20 and a driving mechanism, stored in a housing 2a that provides the major appearance of the autonomous mobile equipment 1. A control system 20 includes a collating means 22, a traveling planning means 23, and a traveling control means 24.

The position measuring means 3 is a means for measuring a distance to the object 5 located around the autonomous mobile equipment 1. As a method of measuring a relative position, for example, three methods described below can be adopted. Alternatively, any other method may be adopted. The first method is such that laser light is irradiated to the object 5 and a phase difference of the irradiated light from light reflected from the object is detected in order to measure a distance. The second method is such that laser light is irradiated to the object 5 and a light receiving unit separated from an irradiating unit receives light reflected from the object 5 so as to calculate a distance to the object 5 according to the principles of a trigonometric survey. The third method is such that a sound wave is irradiated to the object 5 and a phase difference of the irradiated wave from a wave reflecting from the object 5 is detected in order to measure a distance.

The position measuring means 3 included in the present example is mounted on the top of the housing 2a so that it can be rotated. The position measuring means 3 sweeps radiation such as a light wave or a sound wave substantially horizontally, and thus measures a relative angle at which the position measuring means meets the object 5 present within a predetermined angular range and a relative distance to the object 5. Consequently, the position measuring means 3 detects the superficial shape of the object 5. The position measuring means 3 may be mounted on the face of the housing 2a. The radiation may be irradiated obliquely downward. The moving means 4 includes four wheels 12 attached to the bottom of the housing 2a and a motor 11 that drives the wheels 12, and causes the autonomous mobile equipment 1 to travel.

The position-of-object and own position detecting system 6 includes the position measuring means 3, a database 21, and the collating means 22. Data that associates the positional information on the object 5, the information on the shape of the object, and attribute data with one another according to the superficial shape of the object 5 is stored in advance in the database 21. The stored information on the object 5 includes the information on the superficial shape, that is, a given pattern of irregularities. The collating means 22 collates the superficial shape of an object detected by the position measuring means 3 with the superficial shape of the object 5 recorded in the database 21, and thus identifies the object 5. Consequently, the position-of-object and own position detecting system 6 can detect the position of the object 5 and the own position of the autonomous mobile equipment 1. The pieces of information on the positions are transmitted from the collating means 22 to the traveling planning means 23.

The traveling planning means 23 plans a traveling route and a speed, along and at which the autonomous mobile equipment 1 travels, according to the pieces of information on the position of the object 5 and the own position of the autonomous mobile equipment 1 which are sent from the collating means 22. The traveling planning means 23 produces a plan time-sequentially or at regular intervals according to the pieces of information sent from the collating means 22, and the plan is transmitted to the traveling control means 24. The traveling control means 24 controls the drive of the motor 11 included in the moving means 4 according to the plan the traveling planning means 23 so as to allow the autonomous mobile equipment 1 to travel along a predetermined route.

Next, referring to FIG. 2 and FIG. 3, concrete actions to be performed by the autonomous mobile equipment 1 and the position-of-object and own position detecting system 6 will be described below.

Figure 2:
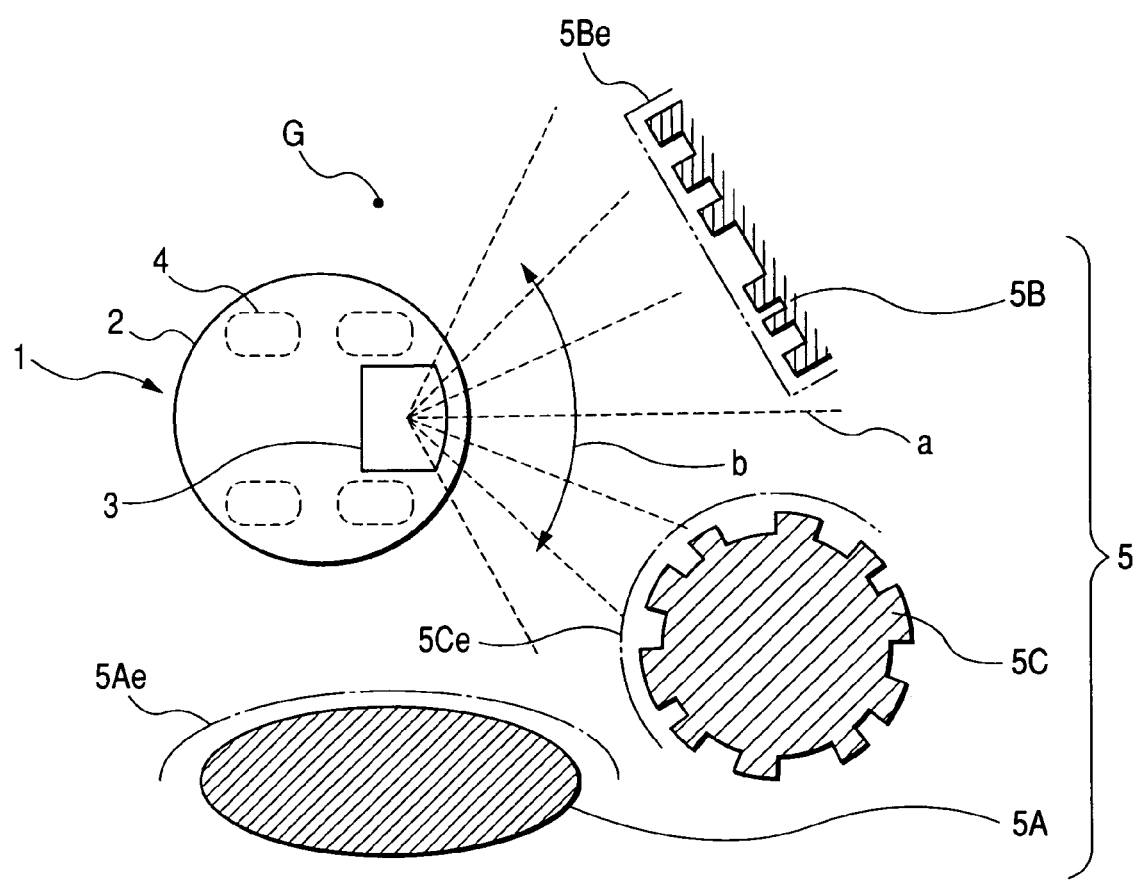
FIG. 2 is a bird's-eye view for use in explaining an example of actions to be performed in a movable region G by the autonomous mobile equipment.

As shown in FIG. 2, aside from the autonomous mobile equipment 1, the objects 5A to 5C are present in a region G. FIG. 2 is a bird's-eye view showing an example of actions which the present example of autonomous mobile equipment 1 will perform within the movable region G. In FIG. 2, the objects 5B and 5C are known objects, that is, objects recorded in the database 21. On the other hand, the object 5A is an unknown object that is not registered in the database 21. The position measuring means 3 irradiates laser light or any other radiation a forward as indicated with arrow b. The radiation a is swept substantially horizontally in order to acquire pieces of information on relative angles, at which the position measuring means meets the respective objects 5A to 5C, and relative distances to the respective objects 5A to 5C.

Figure 3:
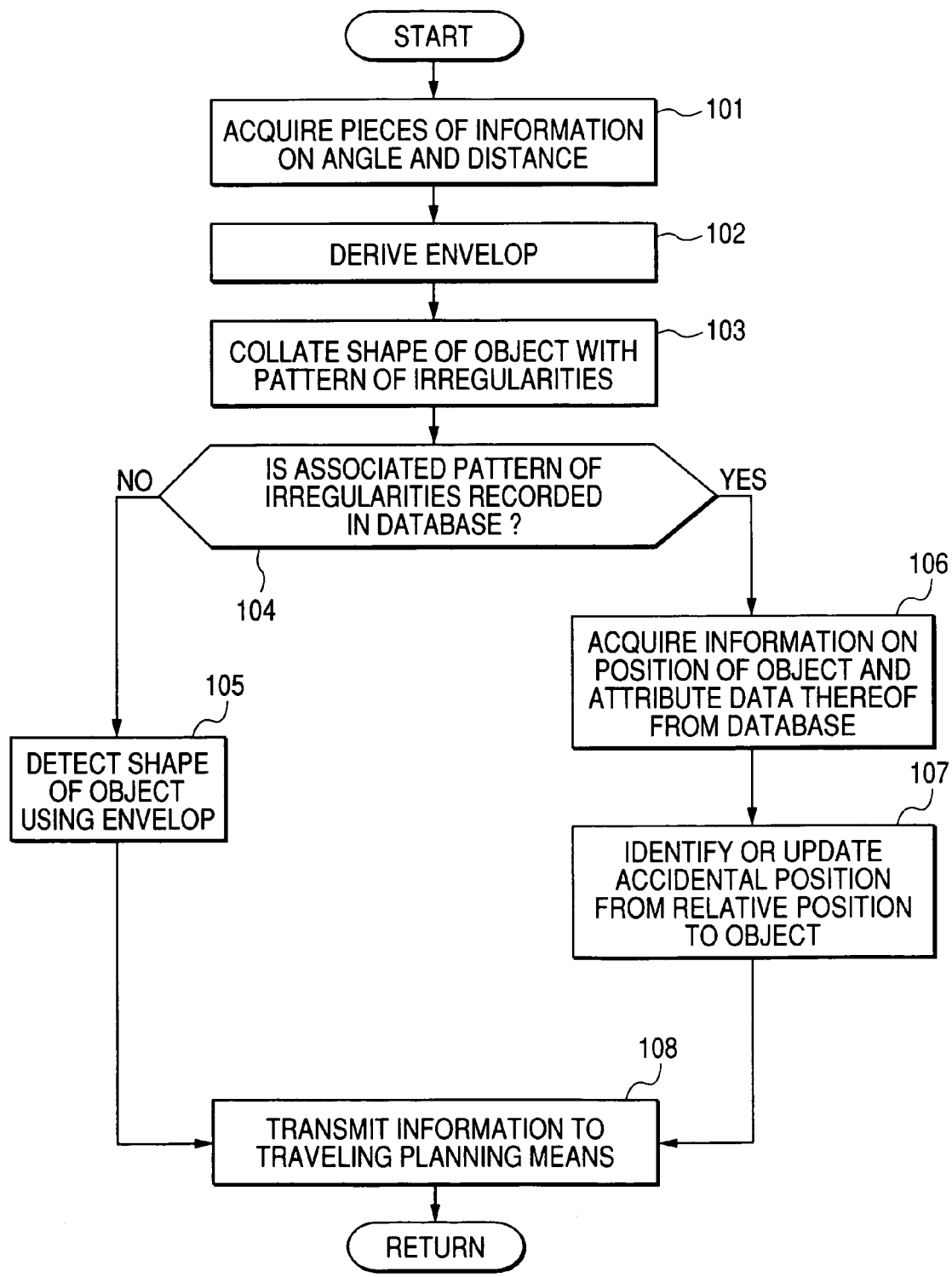
FIG. 3 is a flowchart describing the actions to be performed by the autonomous mobile equipment.
Figure 4:
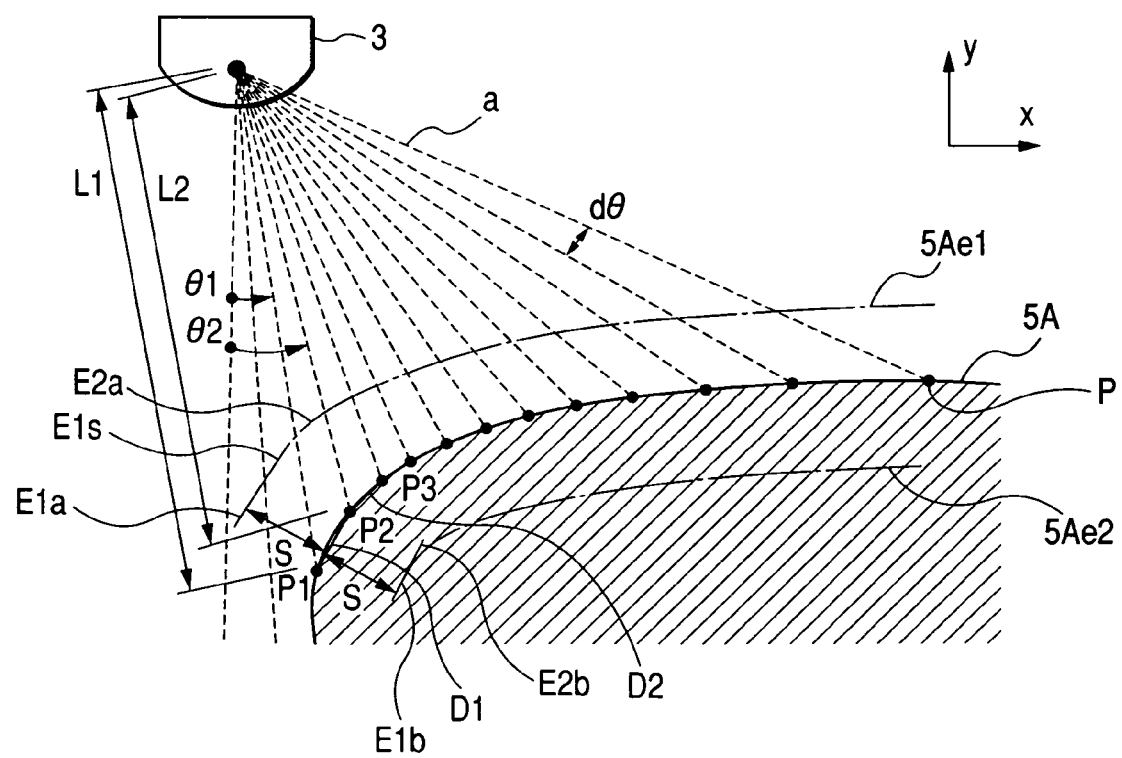
FIG. 4 to FIG. 6 are explanatory diagrams concerning a procedure of deriving an envelope from an unknown object.

In the ambient environment, the collating means 22 identifies the objects 5A to 5C and the own position of the autonomous mobile equipment 1 according to a procedure described in FIG. 3. FIG. 3 is a flowchart describing actions to be performed by the position-of-object and own position detecting system included in the autonomous mobile equipment in accordance with the present embodiment.

First, the pieces of information on the relative angles, at which the position measuring means 3 meets the respective objects 5A to 5C, and the relative distances to the objects 5A to 5C are acquired according to the foregoing method (step 101). Thereafter, envelopes 5Ae to 5Ce are derived based on the acquired pieces of information on the angles and distances so that the envelopes will cover the contours of the respective objects (step 102).

Thereafter, given patterns of irregularities are collated with the superficial shapes of the objects 5A to 5C (step 103). As for the object 5A, since a pattern of irregularities associated with the superficial shape of the object 5A is not recorded in the database 21 (step 104), the envelope 5Ae that is derived from the object 5A at step 102 is designated as the contour of the object (step 105). On the other hand, as for the object 5B or 5C, since a pattern of irregularities associated with the superficial shape of the object 5B or 5C is recorded in the database 21 (step 104), the pieces of information on the position and shape of the object 5B or 5C, and attribute data thereof are retrieved from the database 21 (step 106). Furthermore, since the position of the object 5B or 5C is recorded in the database 21, the own position is updated based on the recorded value (step 107). The reason why the own position is updated is that although the traveling control means 24 monitors a magnitude of movement made by the moving means 4, a planned magnitude of movement may have an error from an actual magnitude of movement because of a skid against a contact surface.

The information on the envelope designated at step 105 or the pieces of information on the object acquired at step 106 and the information on the own position are transmitted to the traveling planning means 23 (step 108). The traveling planning means 23 plans a traveling route, along which the autonomous mobile equipment 1 travels, according to the pieces of information.

Next, the steps described in conjunction with FIG. 3 will be described with reference to FIG. 4 to FIG. 10. To begin with, a method of deriving the envelope 5Ae from the object 5A at step 102 will be described in conjunction with FIG. 4.

The position measuring means 3 irradiates laser light or any other radiation a to the object 5A at intervals of a horizontal angular resolution $d\theta$. Light reflected from the object is measured in order to discretely calculate a distance L to a dot point P. The position of the point P relative to the autonomous mobile equipment 1 is calculated based on the distance L and angle $\theta$.

A straight line E1$a$ and a straight line E1$b$ are defined at positions separated by the distance S from a straight line D1 linking points P1 and P2 in parallel with the straight line D1. The value of the distance S is given in advance. The horizontal angular resolution and distance resolution of the position measuring means 3 and the distance L to the object 5A are taken into consideration so that the actual object 5A will not jut out of an envelope 5Ae$_1$ to be derived finally. Likewise, a straight line E2$a$ and a straight line E2$b$ are defined in parallel with a straight line D2 linking points P2 and P3. This procedure is performed on all points P. If adjoining straight lines E, for example, the straight lines E1$a$ and E2$a$ do not have a point of intersection, limits of both the straight lines E are linked with a straight line E1$s$. Otherwise, the adjoining straight lines are linked with an arc E1$r$ having a radius S with a middle point P, for example, a point P2 as a center.

According to the foregoing procedure, two envelopes 5Ae$_1$ and 5Ae$_2$ are derived, and the envelope 5Ae$_1$ derived near the autonomous mobile equipment 1 is recognized as the contour of the object 5A. Thus, the envelope 5Ae$_1$ fitted to the contour of the unknown object 5A can be derived.

Figure 5:
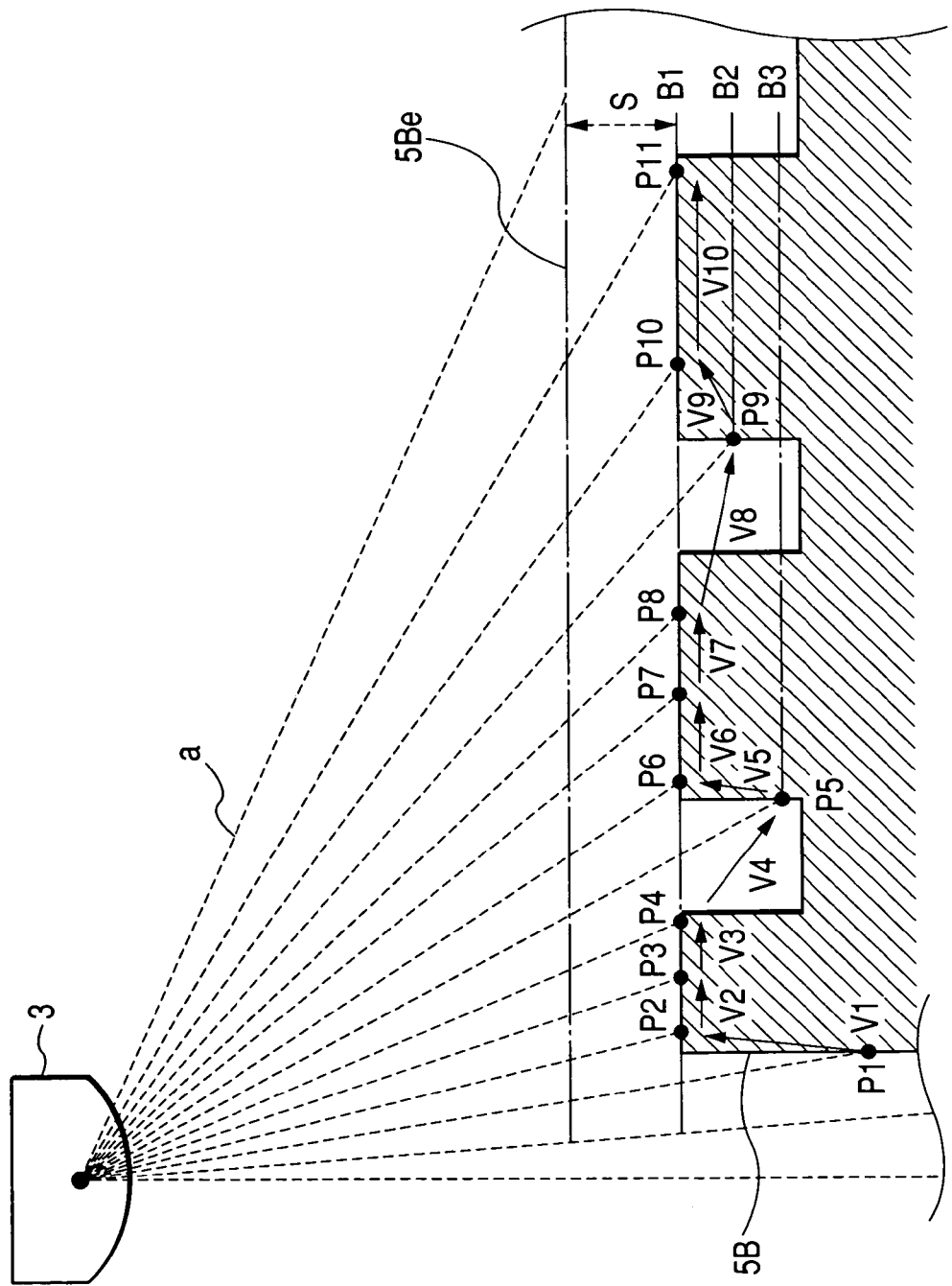
Figure 6:
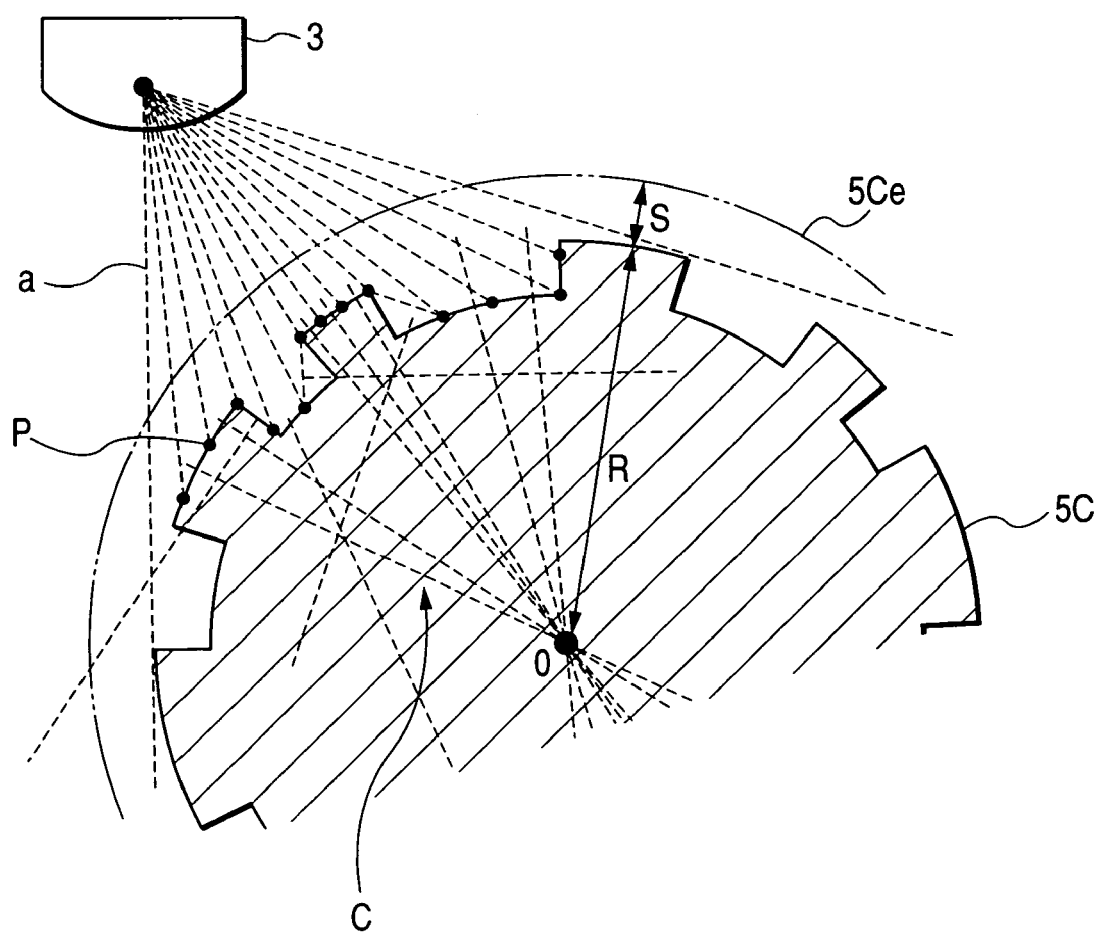

Next, a method of deriving envelopes 5Be and 5Ce from the objects 5B and 5C that are major objects will be described in conjunction with FIG. 5 and FIG. 6. FIG. 5 shows a method applied to the object 5B having a box-like shape, and FIG. 6 shows a method applied to the object 5C having a cylindrical shape. For the shapes of the known typical objects 5B and 5C, the employment of the method described below would improve the precision in identifying the contours of the objects 5B and 5C.

Referring to FIG. 5, the positions of measurement points P1 to P11 are measured by the position measuring means 3 according to the same method as the one described in conjunction with the object 5A.

Thereafter, vectors V1 to V10 directed to adjoining points P are calculated, and those of the vectors whose unit vectors agree with one another are sampled. In FIG. 5, the unit vectors of vectors V2, V3, V6, V7, and V10 are substantially equal to one another. A surface line defined closest to the position measuring means 3 is selected from among surface lines B1 to B3 parallel to the unit vectors of the sampled vectors directed to the respective measurement points P. The selected surface line B1 is used to derive an envelop 5Be at a position separated by the distance S toward the position measuring means 3 in a direction orthogonal to the unit vectors. Thus, the envelop 5Be can be derived from the known shape highly precisely. If the number of unit vectors that agree with one another is smaller than a predetermined number of unit vectors, the shape of an object concerned is not recognized to have the known shape.

Even in the case shown in FIG. 6, the positions of measurement points P1 to P13 are measured by the position measuring means 3. A line C orthogonal to a middle point between adjoining points P is defined. As shown in FIG. 6, when the object 5C has a cylindrical contour, a plurality of orthogonal lines C intersect on a center line O of a cylinder. For this reason, the object 5C is recognized as a cylindrical object. The radius R of the cylindrical object is drawn out of the distance between the measurement point P and the center line O. An envelop 5Ce is derived to have a radius (R+S) that is the sum of the radius R and the distance S. Consequently, the shape of an object is fitted to a known shape according to an adopted identification method. As for the object 5A whose shape is not fitted to any known shape, an envelop 5Ae is derived according to a method of linking measurement points.

Figure 7:
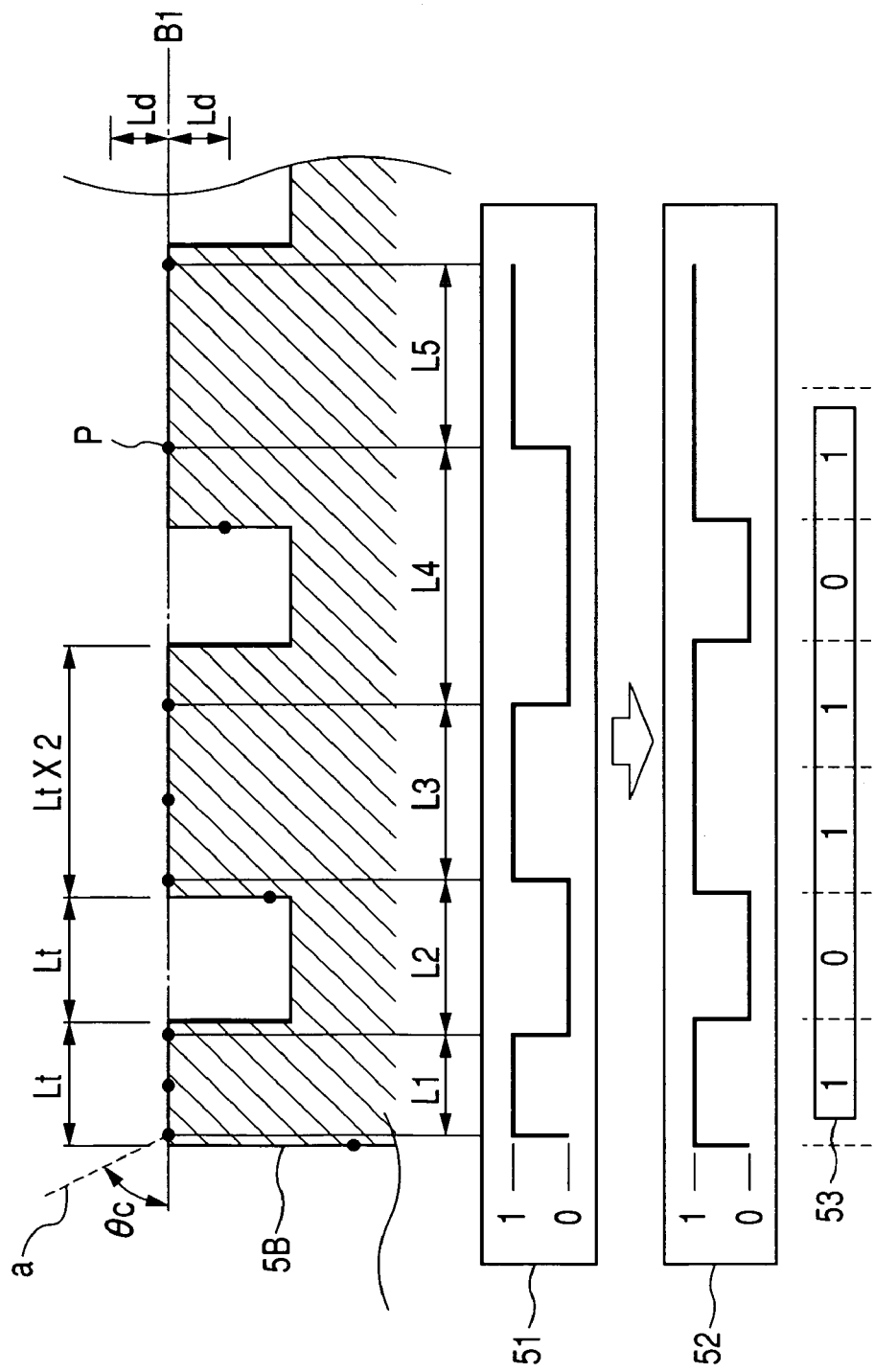
FIG. 7 and FIG. 8 are explanatory diagrams concerning a method of binary-coding a pattern of irregularities on an object on the basis of the position of a measurement point.

Next, referring to FIG. 7 and FIG. 8, a method of collating the shape of an object with a pattern of irregularities at step 103 will be described below. The method of collating the shape of the box-like object 5B with a pattern of irregularities will be described in conjunction with FIG. 7. FIG. 7 is an explanatory diagram concerning a method of binary-coding a pattern of irregularities associated with the shape of the box-like object 5B shown in FIG. 5 using the positions of measurement points P.

At step 102 of deriving the envelop 5Be described in conjunction with FIG. 5, measurement points P are selected from a range separated by the distance Ld from the surface line B1 in a direction orthogonal to the surface line. An interval including selected measurement points P and a measurement point interposed between the selected measurement points is regarded as an interval represented by 1, and an interval including an unselected measurement point P and succeeding and preceding measurement points P is regarded as an interval represented by 0. Thus, a binary pattern 51 is produced. Herein, since the position measuring means 3 radially scans the object 5B, the space between adjoining measurement points P is not constant. Combinations of intervals and bits and spaces L1 to L5 are recorded.

However, when it says that the binary data including space data is used to perform collation, it means that the number of data items equal to the number of spaces is needed. Consequently, it takes much time to complete the collation. According to the present embodiment, a pattern of irregularities associated with the object 5B is produced in units of a unit length Lt. Therefore, the binary pattern 51 is recomposed into a binary pattern 52, that is, a pattern of bits associated with the unit lengths Lt, whereby an irregular shape can be corrected. Moreover, the binary pattern 52 can be converted into binary data 53 devoid of space data. The use of the binary data 53 devoid of space data makes it possible to shorten a collation time.

For improvement of the reliability of the binary data 53, a large number of measurement points P should preferably be included in a range defined with the unit length Lt. For example, assume that θc denotes an angle at which the surface line B1 meets laser light or any other radiation a, Lc denotes a distance between the position measuring means 3 and a measurement point P2, dθ denotes a distance resolution that is offered by the position measuring means 3 and that is sufficiently short, and np denotes a threshold for the number of measurement points P. In this case, the space Lp between the measurement points P2 and P3 is given by the following expression (1):

$$Lp = Lc \times d\theta \div \cos\theta c \quad (1)$$

If the following condition (2) is satisfied, the calculated space Lp is adopted as highly reliable data.

$$np < Lt \div Lp \quad (2)$$

Figure 8:
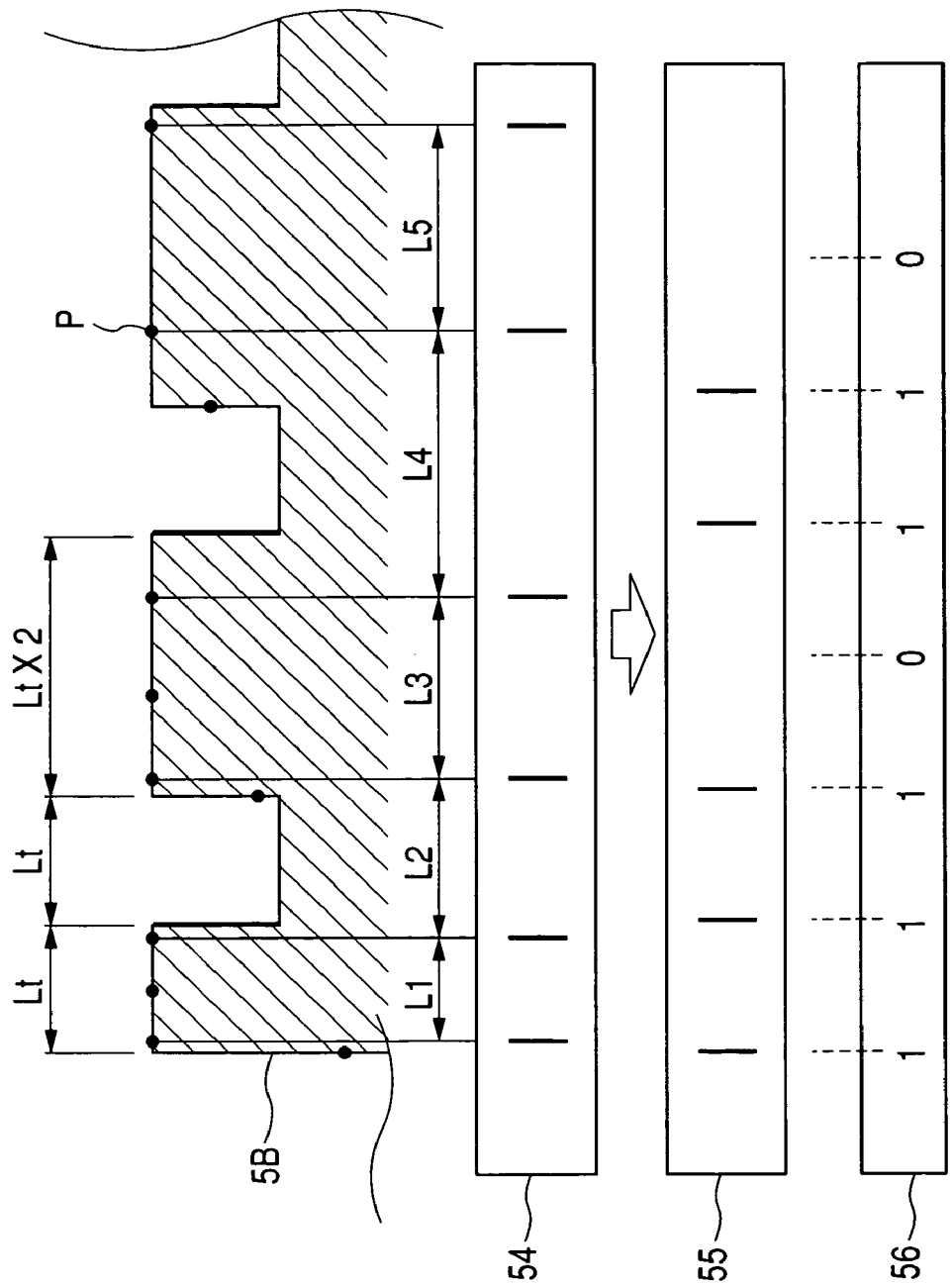

Referring to FIG. 8, another method of collating the shape of the box-like object 5B with a pattern of irregularities will be described below. FIG. 8 is an explanatory diagram concerning another method of binary-coding a pattern of irregularities associated with the shape of the box-like object 5B shown in FIG. 5.

In FIG. 8, a position on the object 5B at which the superficial shape of the object 5B changes from a convex state to a concave state or vice versa is represented by 1. This results in a binary pattern 54. However, the binary pattern 54 is represented by binary data including space data. Therefore, if the binary data 54 including space data is used as it is, it takes too much time to complete collation. Therefore, the idea of the unit length Lt is introduced in order to produce binary data that contains 0 or 1 at regular intervals and that represents a binary pattern like the binary pattern 55. Thus, binary data 56 devoid of space data is produced.

Since the position measuring means 3 sweeps radiation a substantially horizontally, the pattern of irregularities should be elongated substantially vertically, that is, the pattern of irregularities should remain constant over a long range. In this case, even if the position measuring means 3 tilts along with the slope of a road or the like, the position measuring means 3 can obtain a pattern of irregularities.

Next, the database 21 will be described in conjunction with FIG. 9. FIG. 9 shows an example of the structure of the database 21 in FIG. 1.

The database 21 includes known object numbers, codes representing patterns of irregularities on the surfaces of objects, pieces of positional information, and attribute data items. In the example of FIG. 9, object number 1 is assigned to an object shaped like a rectangular parallelepiped. The object has a dimension xs1 in an x direction from an origin (xg1,yg1), a dimension ys1 in a y direction from the origin, and a dimension zs1 in a z direction from the origin. Object number 2 is assigned to an object having a cylindrical shape, and the object has a radius rs1 with an origin (xg2,yg2) as a center and a dimension zs2 in the z direction. Attribute data signifies, for example, the material of an object, whether the object is dangerous, whether the object is a charging station for the autonomous mobile equipment 1, or the like.

The collating means 22 compares the binary data 53 or 56 with the codes recorded in the database 21. If the binary data agrees with a large number of successive bits equal to or larger than a predetermined number of successive bits, the collating means 22 recognizes the object as a known object.

As mentioned above, the pieces of information on the known objects 5B and 5C are used to acquire pieces of information on the accurate position and shape of the object 5. The reliability in planning of a traveling route is improved. In particular, at step 102, the shape of only a portion of the object oriented to the position measuring means 3 can be identified. However, the method makes it possible to learn the shape of the periphery of an object. Consequently, a longer route can be planned.

Figure 10:
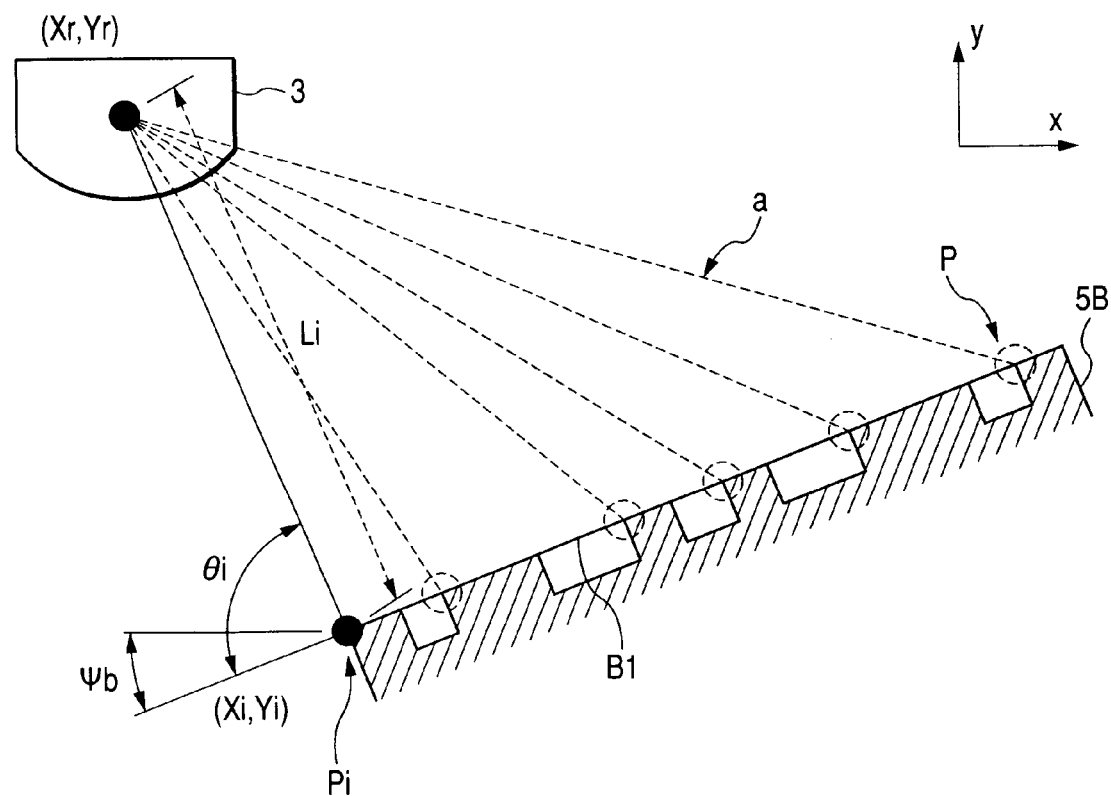
FIG. 10 is an explanatory diagram concerning a method of calculating an own position.

Next, a method of updating an own position at step 107 will be described in conjunction with FIG. 10. FIG. 10 is an explanatory diagram concerning a procedure of updating an own position mentioned in FIG. 3.

Errors occurring during movements of the autonomous mobile equipment 1 may be accumulated. Consequently, a position the autonomous mobile equipment 1 itself identifies may be different from an actual position. The difference from an actual position adversely affects both planning of traveling and actual traveling based on a plan. In order to avoid the adverse effect, the position the autonomous mobile equipment itself identifies must be appropriately corrected. Herein, the own position is corrected based on positional information on the object 5 recorded in the database 21 and a relationship between the relative positions of the autonomous mobile equipment 1 and object 5 measured by the position measuring means 3.

Through the processing ending at step 106, distances Li to measurement points Pi, angles θi at which the surface line B1 meet radiations a, and coordinates (Xi,Yi) representing the measurement points Pi are obtained. Moreover, an angle ψb at which a line linking an origin and a point represented by coordinates (X,Y) meets the object 5B can be inferred from the positional information recorded in the database 21. Herein, measurement points on convex parts near points, at which the surface of an object changes from a concave state into a convex state or vice versa, are selected as the measurement points Pi. This is because a distance to a point at which the surface of an object changes from the concave state into the convex state can be calculated based on the unit length Lt, and coordinates representing a point near a measurement point Pi can be calculated based on the distance. Assuming that coordinates representing the position of the autonomous mobile equipment 1 are coordinates (Xr,Yr), the coordinates (Xr,Yr) are given by the following expression (3):

$$(Xr,Yr)=(Xi+Li\times\cos(\theta i+\psi b), Yi+Li\times\sin(\theta i+\psi b)) \quad (3)$$

As mentioned above, the measurement point Pi does not always coincide with a point at which the surface of an object changes from the concave state into the convex state. Preferably, the pieces of information on a plurality of measurement points are used to solve the expression (3), and coordinates representing the position of the autonomous mobile equipment 1 are calculated as a mean of solutions.

As described so far, a predetermined pattern of irregularities is associated with the surface of the object 5, and information on a pattern of irregularities associated with a known object 5 is given to the autonomous mobile equipment 1. This allows the autonomous mobile equipment 1 to accurately identify an ambient environment. Moreover, the autonomous mobile equipment can calculate its own position from the position of the object 5 and correct recorded data representing the own position. Consequently, the autonomous mobile equipment 1 can travel accurately.

Furthermore, if an unknown object and a known object coexist in an environment, the position measuring means 3 is essentially needed in order to identify the position and shape of the unknown object. The autonomous mobile equipment in accordance with the present embodiment can be realized without an increase in the cost of the equipment.

According to the present example of autonomous mobile equipment 1, the position and shape of an object and an own position can be identified using a simple configuration. Moreover, compared with a case where the position and shape of an object and an own position are identified based on image processing, identification can be achieved highly precisely and inexpensively at a high sampling rate with excellent environmental robustness against external light. Pieces of detailed information on the position and shape of a known object placed in the environment can be acquired. Moreover, the own position can be calculated based on the position of the known object and used to accurately correct recorded data representing the own position. Consequently, the accurate traveling of the autonomous mobile equipment 1 can be realized.

What is claimed is:

1. An autonomous mobile equipment designed to autonomously move in an environment in which an object other than the autonomous mobile equipment is present, and provided with a position-of-object and own position detecting system and a moving means, the position-of-object and own position detecting system including:

a position measuring means for measuring information on the object;
 a traveling planning means for planning a traveling route along which the autonomous mobile equipment travels;
 a database in which information on the object placed in the environment is recorded; and
 a collating means for collating the information on the object acquired by the position measuring means with the information on the object recorded in the database,
 wherein:
 the position measuring means irradiates radiation to the object and radially scans the radiation so as to measure a relative angle, at which the autonomous mobile equipment meets the object, and a relative distance to the object, and thus detects the superficial shape of the object;
 the database records, in advance, binary information on the superficial shape with a pattern of irregularities of the object placed in the environment using a predetermined unit length as a reference, position information of the object placed in the environment, attribute information of the object laced in the environment, and data that associates the positional information on the object, the information on the shape of the object and attribute data with one another according to the superficial shape of the object;
 the collating means produces binary information on the superficial shape of the object detected by the position measuring means using the predetermined unit length as a reference, recomposes the produced binary information into binary information associated with the unit length, converts the recomposed binary information into binary data devoid of space data, and collates the converted binary information with the binary information on the superficial shape of the object recorded in the database;
 the information on the object recorded in the database is transmitted to the traveling planning means in case where the collated superficial shapes agree with each other;
 the information on the object acquired by the position measuring means is transmitted to the traveling planning means in case where the collated superficial shapes disagree with each other; and
 the traveling planning means plans a traveling route, along which the autonomous mobile equipment travels, on the basis of the information on the object sent from the collating means.

2. The autonomous mobile equipment according to claim 1, wherein a binary pattern expressing the object is elongated substantially perpendicularly to the surface of the object scanned by the position measuring means.

3. The autonomous mobile equipment according to claim 1, wherein a binary pattern expressing the object is elongated substantially perpendicularly to the surface of the object scanned by the position measuring means.

4. The autonomous mobile equipment according to claim 1, further comprising a traveling control means for controlling the moving means according to a plan produced by the traveling planning means.

5. The autonomous mobile equipment according to claim 1, further comprising a traveling control means for controlling the moving means according to a plan produced by the traveling planning means.

6. The autonomous mobile equipment according to claim 1, further comprising a traveling control means for controlling the moving means according to a plan produced by the traveling planning means.

7. A position-of-object and own position detecting system included in autonomous mobile equipment that moves in an environment in which the autonomous mobile equipment and an object other than the autonomous mobile equipment are present, comprising:

a position measuring means for measuring information on the object;

a database in which information on the object placed in the environment is recorded; and a collating means for collating the information on the object measured by the position measuring means with the information on the object recorded in the database, wherein:

the position measuring means irradiates radiation to the object and radially scans the radiation so as to measure a relative angle, at which the autonomous mobile equipment meets the object, and a relative distance to the object, and thus detects the superficial shape of the object;

the database records, in advance, binary information on the superficial shape with a pattern of irregularities of the object placed in the environment using a predetermined unit length as a reference, position information of the object placed in the environment, attribute information of the object placed in the environment, and data that associates the positional information on the object, the information on the shape of the object and attribute data with one another according to the shape of the object;

the collating means produces binary information on the superficial shape of the object detected by the position measuring means using the predetermined unit length as a reference, recomposes the produced binary information into binary information associated with the unit length, converts recomposed binary information into binary data devoid of a ace data, and collates the converted binary information with the binary information on the superficial shape of the object recorded in the database;

the information on the object recorded in the database is transmitted in case where the collated superficial shapes agree with each other; and the information on the object acquired by the position measuring means is transmitted in case where the collated superficial shapes disagree with each other.

* * * * *